A. MARKS.
TIRE SPREADER.
APPLICATION FILED DEC. 27, 1920.
1,379,354.
Patented May 24, 1921.
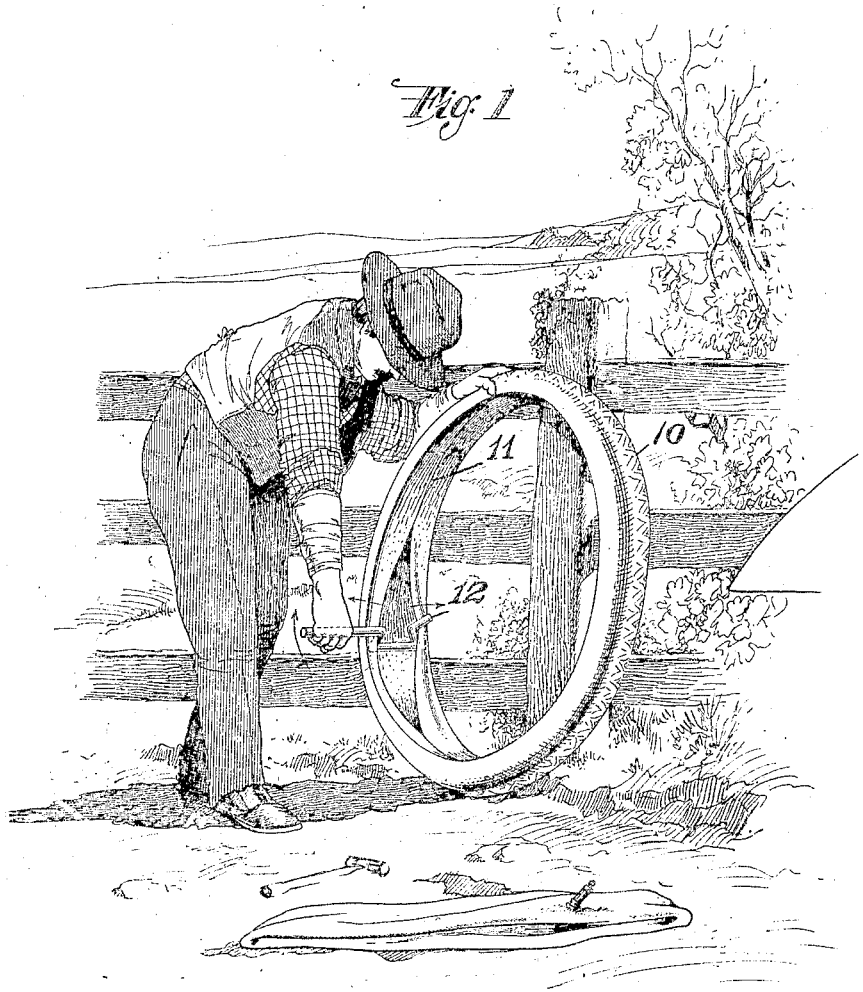
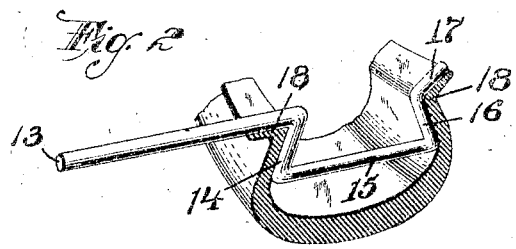
INVENTOR
Abraham Marks,
BY
Wm. H. Caufield,
ATTORNEY.

UNITED STATES PATENT OFFICE.

ABRAHAM MARKS, OF ELIZABETH, NEW JERSEY.

TIRE-SPREADER.

1,379,354.  Specification of Letters Patent.  Patented May 24, 1921.

Application filed December 27, 1920. Serial No. 433,153.

*To all whom it may concern:*

Be it known that I, ABRAHAM MARKS, a citizen of Lithuania, and a resident of Elizabeth, county of Union, and State of New Jersey, have invented certain new and useful Improvements in Tire-Spreaders, of which the following is a specification.

This invention relates to an improved tire spreader which is easily handled and takes up but little room in a tool box, and which is easily manipulated to spread the inside split wall of a tire casing so as to permit a complete inspection of the inside of the casing and also to hold the tire casing apart if it needs repair on the inside.

The invention is illustrated in the accompanying drawing, in which Figure 1 is a view illustrating the device and the way it is used, and Fig. 2 is a detail perspective of a spreader, showing the tire casing in section.

In the drawing 10 indicates the tire casing of a pneumatic tire, these being made so that the inner wall is split, as at 11, the natural resiliency of the material of the tire holding this split part tightly together, and in order to inspect it the two walls must be spread apart to a considerable extent to give a clear view of the entire inner face of the tire casing.

In order to do this I provide a spreader 12, which is made preferably of one piece of metal and is provided on one end with a handle portion 13 of any desired configuration, but is preferably made simply from a straight bar, the bar at the end of the handle being bent, as at 14, at a somewhat acute angle to the handle, and for clearness of description the parts bent in the direction of the handle are described as being bent inwardly, and those in the direction away from the handle as outwardly, and in the illustration those parts shown below the handle are considered downward.

This part 14 will thus be described as being bent inwardly and downwardly, the bar then being bent to form a spreader portion 15 which can be of any desired configuration, but in order to minimize friction it is formed straight and substantially parallel with the handle 13 and then bent, as at 16, upwardly and inwardly, and then, as at 17, upwardly and outwardly. The spreader portion 15 thus has two recessed ends which receive the edges 18 of the split portion of the tire casing and hold them part. This conformation also holds the spreader within the casing when it is released from the hand, when it is desired to hold the tire casing apart for the purpose of repairing it.

The inclined parts 14 and 16 prevent the spreader from accidentally coming out of the casing, since if it were pulled out straight it would further spring the tire casing apart, and this pressure holds the spreader in position. On the other hand, the handle portion 13 and the end 17 prevent the pressure from forcing the spreader within the casing and the parts are held in the position shown in Fig. 2.

The manner of use is clearly illustrated in Fig. 1, the person using the device grasping the handle and sweeping it around the inner face of the casing to successively present parts of the inner face of the casing to view. When it is inserted in the tire casing the spreader part 15 is placed longitudinally on the split part 11 until it is within the casing and then bent by means of the handle, which provides the necessary leverage, until it is in the position shown in Figs. 1 and 2, the form of the spreader causing the parts of the casing to assume their spread positions. The bar is preferably round, thus providing a minimum of surface in contact with the tire, and there is no undue friction between the spreader and the tire, so that it is comparatively easy to pull the spreader around inside the casing.

I claim:

1. A tire spreader consisting of a metal bar having one end forming a handle portion, the bar being then bent at an acute angle to the handle, then extending forward substantially parallel with the handle, then bent back to a point substantially opposite the bent end of the handle, and then bent divergent so as to form a recessed end, all the bent portions being in substantially the same plane.

2. A one-piece tire spreader formed of a bar with a handle portion and a spreader portion, said spreader portion having recessed ends, one of said ends connecting the spreader portion with the handle.

3. A tire spreader formed of a bar with a handle portion, then bent downwardly and inwardly, then parallel with the handle, then upwardly and inwardly to a point substantially opposite the end of the handle, then outwardly and upwardly.

In testimony that I claim the foregoing, I have hereto set my hand, this 23rd day of December, 1920.

ABRAHAM MARKS.